United States Patent
Xue et al.

(10) Patent No.: US 7,521,387 B2
(45) Date of Patent: Apr. 21, 2009

(54) ALKALI-FREE COMPOSITE SEALANT MATERIALS FOR SOLID OXIDE FUEL CELLS

(75) Inventors: Liang A. Xue, Canton, OH (US); Jean Yamanis, South Glastonbury, CT (US); James Piascik, Randolph, NJ (US); Estela T. Ong, Chicago, IL (US)

(73) Assignee: General Electric Company, Schenectady, NY (US)

( * ) Notice: Subject to any disclaimer, the term of this patent is extended or adjusted under 35 U.S.C. 154(b) by 912 days.

(21) Appl. No.: 10/711,477

(22) Filed: Sep. 21, 2004

(65) Prior Publication Data

US 2006/0063659 A1    Mar. 23, 2006

(51) Int. Cl.
| | |
|---|---|
| C03C 8/24 | (2006.01) |
| C03C 8/00 | (2006.01) |
| C03C 8/14 | (2006.01) |
| C03C 3/064 | (2006.01) |
| C03C 3/068 | (2006.01) |
| C03C 3/066 | (2006.01) |
| B05D 5/12 | (2006.01) |
| H01M 2/00 | (2006.01) |
| H01M 2/08 | (2006.01) |

(52) U.S. Cl. ............... 501/15; 501/14; 501/17; 501/77; 501/78; 501/79; 427/115; 429/34; 429/35; 429/36

(58) Field of Classification Search .............. 501/14, 501/15, 17, 77, 78, 79, 21, 32, 2, 4, 5, 8, 501/9; 429/34, 35, 36; 427/115, 126.1, 126.2
See application file for complete search history.

(56) References Cited

U.S. PATENT DOCUMENTS

| | | | | |
|---|---|---|---|---|
| 4,365,021 | A | * | 12/1982 | Pirooz .................. 501/15 |
| 4,774,154 | A | | 9/1988 | Singelyn et al. |
| 5,110,691 | A | | 5/1992 | Krasij et al. |
| 5,453,331 | A | | 9/1995 | Bloom et al. |
| 5,460,897 | A | | 10/1995 | Gibson et al. |
| 5,858,895 | A | * | 1/1999 | Sagara et al. ............ 501/66 |
| 5,922,444 | A | * | 7/1999 | Tsuzuki et al. ............ 428/220 |
| 6,124,224 | A | * | 9/2000 | Sridharan et al. .......... 501/15 |
| 6,261,711 | B1 | | 7/2001 | Matlock et al. |

(Continued)

OTHER PUBLICATIONS

Zheng, et al., J. Power Sources, 128(2): 165-172 (Apr. 2004) "$SiO_2$-CaO-$B_2O_3$-$Al_2O_3$ Ceramic Glaze as Sealant for Planar IT-SOFC".

Primary Examiner—Karl E Group
Assistant Examiner—Noah S Wiese
(74) Attorney, Agent, or Firm—Sutherland Asbill & Brennan LLP

(57) ABSTRACT

A sealant composition for use in sealing solid oxide fuel cells is provided which comprises a glass component which comprises a mixture of alkali-free inorganic oxides, and an optional filler component dispersed in the glass component, said filler component being up to 40% by weight of the composition. The glass component can include, on a mole basis, 20 to 50% BaO, 1 to 10% $Y_2O_3$, 5 to 20% $B_2O_3$, 10 to 30% $SiO_2$, 3 to 35% MgO, 2 to 20% CaO, 1 to 10% ZnO, and 0 to 5% $ZrO_2$, and exemplary filler components include zirconia, alumina, barium titanate, strontium titanate, and combinations thereof.

26 Claims, 2 Drawing Sheets

U.S. PATENT DOCUMENTS

| | | |
|---|---|---|
| 6,271,158 B1 | 8/2001 | Xue et al. |
| 6,362,119 B1 * | 3/2002 | Chiba .......................... 501/15 |
| 6,541,146 B1 | 4/2003 | Xue et al. |
| 6,558,831 B1 | 5/2003 | Doshi et al. |
| 6,811,916 B2 | 11/2004 | Mallari et al. |
| 6,818,134 B2 | 11/2004 | Lemmon et al. |
| 2003/0162883 A1 * | 8/2003 | Fabian et al. ................ 524/494 |
| 2003/0216240 A1 * | 11/2003 | Kodera et al. ................ 501/32 |

* cited by examiner

ALKALI-FREE COMPOSITE SEALANT MATERIALS FOR SOLID OXIDE FUEL CELLS

BACKGROUND OF THE INVENTION

This invention is generally in the field of high-temperature composite sealant compositions, and more particularly composite sealants useful in the fabrication of a solid oxide fuel cell (SOFC) and SOFC stacks.

A fuel cell is a galvanic conversion device that electrochemically reacts a fuel with an oxidant within catalytic confines to generate a direct current. A fuel cell typically includes a cathode material that defines a passageway for the oxidant and an anode material that defines a passageway for the fuel. An electrolyte is disposed between and separates the cathode and anode materials, and electrochemical conversion occurs at or near the three-phase boundary of the electrodes (cathode and anode) and electrolyte, producing a DC electrical output.

The fuel and the oxidant are fluids, usually gases, that are continuously passed through separate cell passageways. In a SOFC, hydrogen or a hydrocarbon is commonly used as the fuel, while oxygen or air is used as the oxidant. The SOFC electrolyte is in a solid form, typically a nonmetallic ceramic, such as dense yttria-stabilized zirconia (YSZ) ceramic, a nonconductor of electrons, which ensures that the electrons must pass through the external circuit to do useful work. The electrolyte provides a voltage buildup on opposite sides of the electrolyte, while isolating the fuel and oxidant gases from one another. The anode and cathode are generally porous, with the anode oftentimes being made of nickel/YSZ cermet and the cathode oftentimes being made of doped lanthanum manganite.

An individual SOFC cell usually generates a relatively small voltage. Thus, the individual electrochemical cells are connected together in series to form a stack, in order to achieve higher, useful voltages. Electrical connection between cells is attained with an electrical interconnect between the cathode and anode of adjacent cells. In addition, the stack usually includes ducts or manifolding to conduct the fuel and oxidant into and out of the stack.

Whether in the form of a stack or individual cells, it is important that the fuel and oxidant be kept separate from one another in order to avoid or minimize efficiency losses in producing the exchange of ions across the electrolyte and to decrease or eliminate the potential for explosions. Consequently, sealants are needed to seal different portions of a SOFC stack, in particular at the edges and where manifolds must be connected to the stack. SOFC sealants, however, remain one of the outstanding materials challenges, as the sealant must meet several, often competing, property requirements.

Generally, the sealant should exhibit the following characteristics: (1) a relatively high coefficient of thermal expansion (CTE) to match that of the stack components, including the cells, interconnects, and manifold materials, which components typically have CTEs ranging from about 9 to $15 \times 10^{-6}/°$C. at 800° C.; (2) a relatively low softening point for thermal stress relief during system shut-down and start-up; (3) a desirable viscosity value, such that the sealant is sufficiently fluid to seal gaps at the sealing/assembling temperature and be viscous enough at the cell operating temperature (typically 700-900° C.) so that gaps are kept sealed under gas pressure differentials; (4) thermally and chemically stable (e.g., negligible phase changes, negligible weight loss, minimum reaction with stack and manifold materials, and minimum ions migration under the electrical field) in the SOFC operating environment and conditions; (5) easily applied between surfaces and able to fill gaps between non-parallel surfaces. These properties are very difficult to satisfy simultaneously.

Various sealant compositions have been made with an effort to achieve the sealant characteristics described above. However, these compositions have their own shortcomings or limitations. For example, U.S. Pat. Nos. 4,774,154 and 5,110,691 disclose sealant compositions that are unsuitable for use at SOFC operating temperatures greater than 400° F. Another example is found in U.S. Pat. No. 6,271,158, which discloses a composite sealant using a glass matrix, which accomplishes the sealing, and one or more fillers that modify the CTE and improve the gap-filling capacity of the composite material. U.S. Pat. No. 6,541,146 also describes sealant materials comprising glasses containing alkali ions. The compositions, however, includes as one of the primary ingredients glasses containing alkali ions (e.g., potassium and sodium). These alkali ions may undesirably tend to migrate towards the anode under electrical field as low as 0.7 volts, which exist in operating fuel cells. Such an ion migration over time causes microstructure defects such as voids, porosity and even bubbling in the sealant, which undermines the long-term stability and integrity of the seal. The patent also discloses using metallic fillers, which at high loading yield undesirable electrical conduction paths, which may provide current leakage detrimental to seal integrity. It therefore would be desirable to provide improved sealant materials that minimize ions migration issues and which satisfy other property requirements of fuel cell sealants.

SUMMARY OF THE INVENTION

In one aspect, a glass or glass-ceramic sealant composition is provided, which comprises a glass constituted from a mixture of alkali-free inorganic oxides, the mixture including, on a mole basis, 20 to 50% BaO, 1 to 10% $Y_2O_3$, 5 to 20% $B_2O_3$, 10 to 30% $SiO_2$, 3 to 35% MgO, 2 to 20% CaO, 1 to 10% ZnO, and 0 to 5% $ZrO_2$. In various embodiments, the glass component comprises on a mole basis 25 to 35% BaO, 1 to 3% $Y_2O_3$, 14 to 18% $B_2O_3$, 15 to 25% $SiO_2$, 10 to 20% MgO, 10 to 18% CaO, 1 to 3% ZnO, or 1 to 2% $ZrO_2$.

In another aspect, a composite sealant composition is provided which comprises a glass component constituted from a mixture of alkali-free inorganic oxides; and a filler component dispersed in the glass component, said filler component being up to 40% by weight of the composition. In at least one embodiment, the glass component, upon heating to a temperature above its softening point, devitrifies and crystallizes to transform the glass component into a glass-ceramic matrix in which the filler component is dispersed. In one embodiment, the glass component comprises, on a mole basis, 20 to 50% BaO, 1 to 10% $Y_2O_3$, 5 to 20% $B_2O_3$, 10 to 30% $SiO_2$, 3 to 35% MgO, 2 to 20% CaO, 1 to 10% ZnO, and 0 to 5% $ZrO_2$.

In one embodiment, the filler component is non-metal. In another embodiment, the filler component comprises zirconia, alumina, barium titanate, strontium titanate, or a combination thereof. In a particular embodiment, the filler component comprises yttria-stabilized zirconium oxide, optionally in combination with barium titanate.

In various embodiments, the glass component and the optional filler component are mixed with a binder system which comprises one or more thermoplastic polymers. In one embodiment, the composition is in the form of a paste. In another embodiment, the composition is in the form of a tape.

In another aspect, a solid oxide fuel cell stack is provided which comprises a first structural component (such as first fuel cell or a fuel cell stack); a second structural component (such as a separator plate or a manifold for directing fuel and oxidant into and out of the stack); and a composite sealant composition disposed between and contacting the first component and the second component, wherein the composite sealant composition comprises a glass component which comprises a mixture of alkali-free inorganic oxides; and a filler component dispersed in the glass component, said filler component being up to 40% by weight of the composition.

In still another aspect, a process is provided for sealing a fuel cell stack, comprising the steps of: (i) forming a composite sealant mixture comprising a glass component, which comprises a mixture of alkali-free inorganic oxides, in which a filler component is dispersed, wherein the filler component is up to 40% by weight of the total weight of the glass component and the filler component; (ii) applying the composite sealant mixture to a selected location of the fuel cell stack; and (iii) transforming the sealant mixture into a composite sealant material to seal the selected sealant location. In one embodiment, the glass component comprises, on a mole basis, 20 to 50% BaO, 1 to 10% $Y_2O_3$, 5 to 20% $B_2O_3$, 10 to 30% $SiO_2$, 3 to 35% MgO, 2 to 20% CaO, 1 to 10% ZnO, and 0 to 5% $ZrO_2$. In another embodiment, the sealant mixture is in the form of a paste or a tape when applied to the selected location. In one embodiment, the sealant mixture further comprises an organic binder material. In one embodiment, the transformation step comprises heating the sealant mixture to a temperature above the softening point of the glass component to devitrify and crystallize the glass component, transforming it into a glass-ceramic matrix in which the filler component is dispersed. The seal made by the process is, in one embodiment, effective under pressure differentials up to 5 psig.

DETAILED DESCRIPTION OF THE INVENTION

Figure 1:
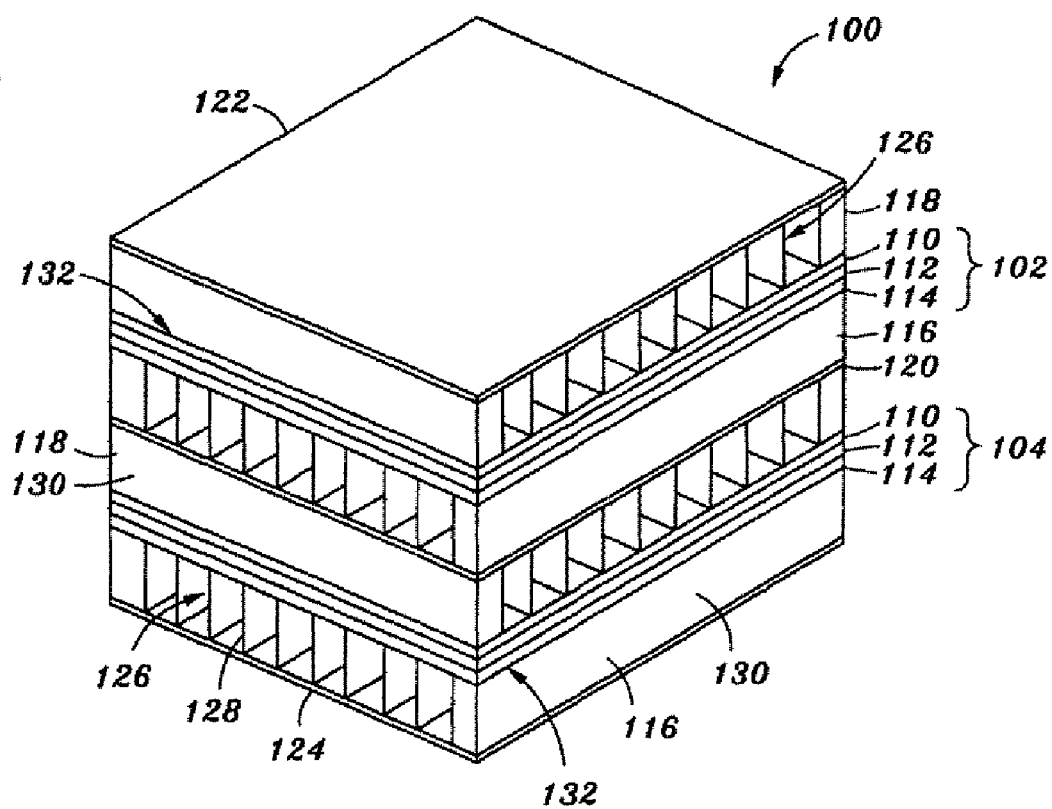
FIG. 1 is a schematic perspective view of an exemplary fuel cell stack.

An alkali ion-free, composite sealant material has been developed that takes advantage of composite and transient microstructure development approaches, which material has excellent gap filling and pressure containment, as well as long-term stability characteristics. The sealant composition comprises an alkali-free glass component that can be devitrified and optionally one or more filler materials. In use, the glass first accomplishes the sealing, and then crystallizes to become a glass-ceramic matrix. The fillers further modify the sealant microstructure and the CTE, significantly improving the gap-filling capacity of the composite material. The composite sealant materials inherently resist ion migration under fuel cell operating conditions.

Upon heating of the glass/filler mixture, the glass component of the sealant composition first melts and accomplishes the required sealing. This step is followed by devitrification of the glass, which becomes a glass-ceramic matrix. The filler, which is present in an amount up to 40% by weight, reinforces the sealant microstructure and further enhances the pressure containment capacity of the seal in solid oxide feel cell stack applications. The composite sealant can effectively seal gaps as wide as 3 mm at differential pressures of 1 psig (70 g/cm$^2$) and shows minimum ion migration under fuel cell operating conditions. In one embodiment, the seal of the fuel cell stack is effective under pressure differentials up to 5 psig.

In another aspect, a glass or glass-ceramic sealant for a SOFC is provided which includes a mixture of alkali-free inorganic oxides, the mixture including, on a mole basis, 20 to 50% BaO, 1 to 10% $Y_2O_3$, 5 to 20% $B_2O_3$, 10 to 30% $SiO_2$, 3 to 35% MgO, 2 to 20% CaO, 1 to 10% ZnO, and 0 to 5% $ZrO_2$.

As used herein, the terms "comprise," "comprising," "include," and "including" are intended to be open, non-limiting terms, unless the contrary is expressly indicated.

Glass Component

The glass component of the sealant materials can be prepared using conventional glass making techniques. The glass component comprises one or more non-alkali glass materials. In one embodiment, appropriate amounts of the glass ingredients are ground together and heated to up to 1450° C. to generate a homogenous glass melt, which is then poured into molds in order to cool and solidify the melt fast and produce ingots. The ingots then are milled to a make a glass powder having a particle size in the range of 1-100 micrometers.

In preferred embodiments, the glass component is 20-50% BaO, 1-10% $Y_2O_3$, 5-20% $B_2O_3$, 10-30% $SiO_2$, 3-35% MgO, 2-20% CaO, 1-10% ZnO, and 0-5% $ZrO_2$ (values expressed as mole percent). In various embodiments, the glass component comprises on a mole basis 25 to 35% BaO, 1 to 3% $Y_2O_3$, 14 to 18% $B_2O_3$, 15 to 25% $SiO_2$, 10 to 20% MgO, 10 to 18% CaO, 1 to 3% ZnO, or 1 to 2% $ZrO_2$.

The glass component may contain a small portion of contaminants. For instance, the glass component may include SrO, which is a common contaminant in BaO. The SrO could be present in the glass component, for example, in amounts from about 1 to about 5 mole %, depending on the mole % of BaO in the glass component.

Filler Component

The composite sealant materials contain up to 40 wt. % non-alkali filler materials. For example, the filler material can be 5 wt %, 10 wt %, or 20 wt. % of the sealant composition. One or more fillers are usually provided as a powder, which is then combined with the glass component.

In one embodiment, the filler component is non-metal or other non-conductive material.

Representative examples of suitable non-metal fillers include zirconia, alumina, barium titanate, strontium titanate, lanthanum chromite, and combinations thereof. In one embodiment, the filler component comprises yttria-stabilized zirconium oxide. In another embodiment, the filler comprises a combination of yttria-stabilized zirconium oxide and barium titanate.

In still other embodiments, the filler comprises non-alkali containing ceramic powders or fibers for further modification of the sealant properties. For example, one can adjust the CTE of the sealant by using either high or low CTE fillers and by varying the amount of fillers. One can adjust the viscosity by varying the amount of fillers.

Methods of Making and Using the Sealant Compositions

The present composite sealant composition can be made and applied by a variety of different methods. In one embodiment, the glass powders are directly mixed with filler powders and/or additional fillers in a desired ratio. The resulting mixture is then applied as a sealant either directly in the form of a powder or following formation of a paste. The paste can be made, for example, by blending the mixture of glass powders and fillers with a solvent/binder system. Representative examples of suitable solvent/binder systems include terpineol and Hereaus V-006. In another embodiment, the glass powders are blended with a solvent/binder system, and then cast into a sheet using tape casting techniques known in the art. In still another embodiment, the glass powders are first made into a paste by mixing with a solvent/binder system, and then the filler powders are added to make the composite sealant paste. In yet another embodiment, the glass powder is made into a first paste by mixing with a first solvent/binder system, and the filler powder is made into a second paste by mixing with a second solvent/binder system. Then, the first paste and the second paste are mixed in a desirable ratio to make the final composite sealant paste. In any of these embodiments, the sealant mixtures or pastes can be applied to places in the fuel cell stack to be sealed and then heated to a temperature higher than the softening point (e.g., 800° C.) of the glass in the composite to make the seal.

In a particular embodiment, a process is provided for sealing a fuel cell stack, comprising the steps of: (i) forming a sealant mixture comprising a glass component, which comprises a mixture of alkali-free inorganic oxides, in which a filler component is dispersed, wherein the filler component is up to 40% by weight of the total weight of the glass component and the filler component; (ii) applying the sealant mixture to one or more selected location of the fuel cell stack; and (iii) transforming the sealant mixture into a composite sealant material to seal the selected sealant locations. The mixture can be in the form of a powder, a paste, a tape, or other form for ready application to a sealing surface. The sealant mixture may further comprise a solvent binder system. The sealant mixture may further comprise an organic binder material. In one embodiment, the transformation step comprises gradually heating the sealant mixture to a temperature above the softening point of the glass component. In various embodiments, the transformation step further comprises volatilizing the solvent and/or organic binder material to substantially eliminate these materials from the composition, in the process of forming the composite seal.

In yet another embodiment, the glass powder and fillers are mixed with a thermoplastic organic binder to form a plastic mass that can be flattened into a tape, e.g., by extrusion or rollers, when slightly heated. The tape can then be easily placed between the contact surfaces to be sealed. The fuel component surfaces and tape are then heated to a temperature effective to burn out the organic binder. Then, as the temperature is increased, the glass melts and fills (i.e., seals) the gap between the contacting surfaces. This step is followed by the devitrification of the glass to become a glass-ceramic matrix. The filler reinforces the sealant microstructure and further improves the pressure containment capacity of the seal in solid oxide fuel cell stack applications. The volume ratio of the glass and fillers to the binder materials can vary, typically between 30:70 to 70:30 depending on the powder properties such as size and surface area. Representative examples of suitable organic binder materials include thermoplastic polymers, such as polyvinyl butyral, acrylics, methyl cellulose, wax and others known in the art. The binder materials can further include one or more additives such as plasticizers, and the like, as known in the art. In a preferred embodiment, the organic binder is burned out at a temperature of 500° C. or less.

In still another embodiment, the sealant composition is used to bond a gasket to a fuel cell component, especially for use in fuel cells that need to sustain only low pressure gas flows. For example, a porous gasket that can sustain high pressure drop may be sufficient to contain the gas in low pressure fuel cell, and the sealant composition described herein can be used to secure the gasket between fuel cell components. The sealant-to-gasket thickness ratio can be used to control the pressure drop across the gasket.

In one embodiment, a solid oxide fuel cell stack comprises a first structural component, a second structural component; and the sealant composition described herein disposed between and contacting the first component and the second component, for example to seal a gap between the two components. For example, the first component could be a first fuel cell and the second component could be a separator plate. As another example, the first component could be a stack of two or more fuel cells and the second component could be a manifold for directing fuel and oxidant into and out of the stack.

Figure 2:
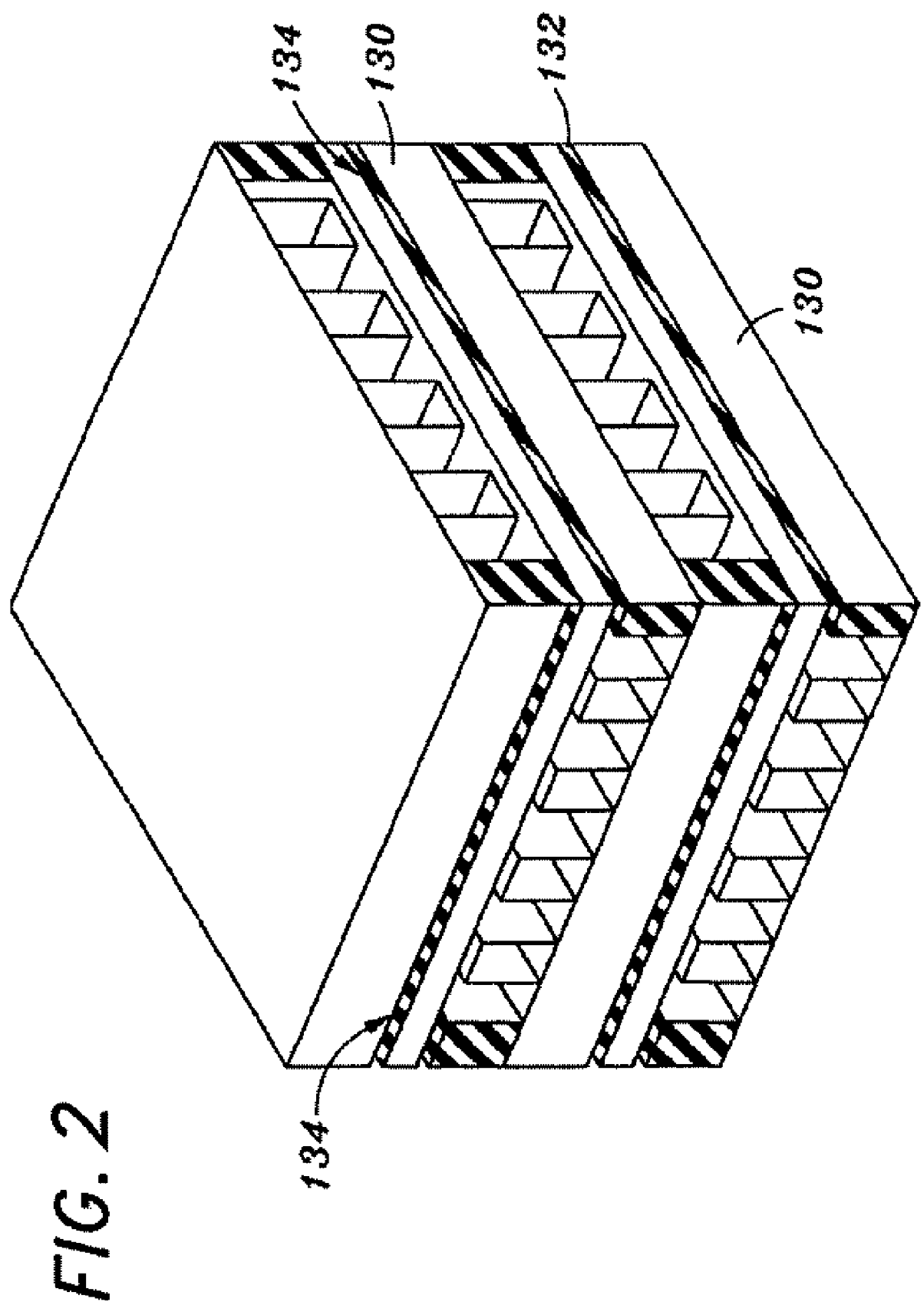
FIG. 2 is a schematic perspective view of an exemplary fuel cell stack shown in FIG. 1 wherein the composite sealant material described herein has been applied to the various sealing locations of the stack.

An exemplified application of the composite sealant material described herein is further illustrated in FIGS. 1 and 2. FIG. 1 shows an exemplary fuel stack 100 comprising fuel cells 102 and 104. Each fuel cell 102, 104 comprises a cathode 110, a solid electrolyte 112, and an anode 114, respectively. Each cell 102, 104 is interposed between an anode-side interconnect 116 and a cathode-side interconnect 118. Interconnects 116 and 118 are separated by a separator plate 120. In this embodiment, a top endplate 122 covers a top surface of the cathode side interconnect 118 of the fuel cell 102 while a bottom end plate 124 covers a bottom surface of the anode side interconnect 116 of the fuel cell 104. The endplates 122 and 124 are the current collectors of the stack 100 and permit current flow during the operation of the stack 100.

The interconnects 116 and 118 comprise a plurality of openings 126 for introducing the fuel and oxidant gas into the fuel cells 102 and 104. In this embodiment, the openings 126 are formed as parallel channels separated by divider walls 128 extending along the cells 102, 104. As shown in FIG. 1, each interconnect 116, 118 terminates with two side-walls 130 which are parallel to divider walls 128 defining openings 126. In this embodiment, intersections 132 formed between the side-walls 130 (of the separator plate) and the cells 102, 104 must be sealed to prevent oxidant gas and fuel mixing, that leads to combustion and higher temperatures, which result in catastrophic device failures.

While the fuel cell stack 100 and its components are shown as being square in overall configuration, it is contemplated that other configurations, such as polygonal or circular, readily could be used with the composite sealant compositions described herein. The fuel cell stack 100 is generally applicable for the use of solid electrolytes. It is also contemplated that the fuel cell stack 100 can be used in the context of at least solid oxide fuel cells which are well known in the art. For the purpose of clarity, in this embodiment, the stack 100 has only two cells. However, in other embodiments, two or more fuel cells can be stacked vertically to form a stack with a multitude of cells.

As shown in FIG. 2, a sealant composition as described herein may be formed along the intersections 132 and locations 134 to effect a gas and fuel tight seal at the intersections 132 and locations 134.

The compositions and methods can be further understood with reference to the following non-limiting examples.

EXAMPLE 1

Composite Sealant in Blended Powder Form

First, 20 grams of a glass powder having a composition (mole percent) of 40% BaO, 2% $Y_2O_3$, 10% $B_2O_3$, 25% $SiO_2$, 5% MgO, 15% CaO, 2% ZnO, and 1% $ZrO_2$ was blended with 4 grams of 8 mol % yttria-stabilized zirconium oxide powder and 1 gram of barium titanate powder in an agate mortar to make a composite sealant mixture. Next, the sealant mixture was applied to a test coupon and heated to 900° C. to make the seal. The temperature was then lowered to 800° C. and held for 100 hours before cooling down to room temperature. The test coupon was found sealed and bonded very well. X-Ray Diffraction (XRD) analysis indicated that the glass in the seal had devitrified/crystallized to become a glass-ceramic.

EXAMPLE 2

Sealant Composition by Addition of Filler to Glass Paste

First, 40 grams of a glass powder having a composition (mole percent) of 35% BaO, 2% $Y_2O_3$, 10% $B_2O_3$, 23% $SiO_2$, 22% MgO, 5% CaO, 2% ZnO, and 1% $ZrO_2$ was blended with 10 grams of a solvent/binder system (Alpha-terpineol/Heraeus V-006, 55:45 ratio) to make a glass paste. Then, 2.0 grams of 8 mol % yttria-stabilized zirconium oxide powder was added to 10 grams of the glass paste and mixed to form a composite sealant mixture in paste form.

EXAMPLE 3

Sealant Composition by Mixing Filler Paste with Glass Paste

First, 40 grams of 8 mol % yttria-stabilized zirconium oxide powder was blended with 10 grams of a solvent/binder system (Alpha-terpineol/Hersaeus V-006, 55:45 ratio) to make a filler paste. Then, 5 grams of the filler paste was added to 20 grams of the glass paste made in Example 2 and mixed to form a composite sealant mixture in paste form.

EXAMPLE 4

Sealant Composition by Mixing Glass Paste with Filler Paste

First, 100 grams of a glass powder having a composition (mole percent) of 30% BaO, 2% $Y_2O_3$, 16% $B_2O_3$, 20% $SiO_2$, 15% MgO, 14% CaO, 2% ZnO, and 1% $ZrO_2$ was blended with 25 grams of a solvent/binder system (Alpba-terpineol/Heraeus V-006, 55:45 ratio) to make a glass paste. Then, 5.3 grams of the 8 mol % yttria-stabilized zirconium oxide paste made in Example 3 was added to 30 grams of this glass paste and mixed to form a composite sealant mixture in paste form.

EXAMPLE 5

Sealant Composition in Tape Form

A composite sealant tape was made and then utilized. First, 100 grams of a glass powder having a composition (mole percent) of 30% BaO, 2% $Y_2O_3$, 16% $B_2O_3$, 20% $SiO_2$, 15% MgO, 14% CaO, 2% ZnO, and 1% $ZrO_2$ was blended with 17.6 grams of 8 mol % yttria-stabilized zirconium oxide powder as filler. The powder mixture was then mixed intensively, at a temperature of up to 150° C., with 35 grams of a binder system (an organic thermoplastic binder BUTVAR (polybutyral) polymer and a plasticizer S-160). The plastic mass was then flattened to a tape by passing it through rollers heated up to 47° C. The thickness of the tape was adjusted through roller settings and was tailored to the particular gap that was to be sealed.

To use in the fuel cell, the tape would be cut into desired shapes and sizes and then placed between the contacting surfaces, i.e., the two facing surfaces of the gap to be sealed. The fuel cell would usually be heated at a slow rate, 20 to 100° C. per hour. During the course of heating, most of the organic binder would be burned out upon reaching 500° C. As the temperature increased to 850° C. or higher, the glass would melt and fill the gap between the contacting surfaces. The fuel cell temperature would then be adjusted for operation to generate power. Meanwhile, the glass would slowly devitrify under the thermal condition of the fuel cell without any significant effect on its sealing property. The devitrification process would involve crystallization of certain phases forming of new crystalline microstructure within the residual glass matrix. The resulting material would be a glass-ceramic matrix.

EXAMPLE 6

Pressure Testing of Sealant Composition

A 1"-square E-BRITE pressure vessel, open on all four sides and having a gap height of approximately 50 mils, was sealed with the composite sealant mixture made in Example 4. The sealing operation was conducted at 900° C.

The vessel was pressure tested for 100 hours at 0.25 psig (18 g/cm$^2$) at 800° C. At the beginning of the pressure test, the leakage rate was negligible, indicating that the vessel was well sealed. The pressure vessel was simultaneously subjected to an across-the-seal electrical potential of 1.55 volts. It was then subjected to ten thermal cycles between 800° C. and 50° C. (90 min. ramps and 30 min. ramp and 30 min. dwells) while pressurized to 0.25 psig (18 g/cm$^2$). The leakage rate remained negligible.

The vessel was cooled to room temperature and inspected after 10 thermal cycles. The sealant looked substantially similar to the way it appeared prior to testing; no evidence of cracking or sealant displacement was noted.

Again, the vessel was heated and tested at 800° C. under the electrical potential. It survived 100 hours at 0.5 psig (35 g/cm$^2$) and another 100 hours at 1.0 psig (70 g/cm$^2$) which was several times the expected pressure differential in a typical SOFC stack. At the end of the testing, the leakage rate still remained negligible. Upon cooling and inspection, the seal once again appeared intact.

In the above examples, the addition of low to moderate amounts (e.g., between about 5% and about 20% by weight) of filler to the glass did not impair the flowability of the sealant. Upon sealing and under SOFC operating temperatures, the glass devitrified and crystallized to become a glass-ceramic matrix in which the fillers were dispersed and substantially increased the rigidity of the seal. It thus significantly enhanced the gap-holding capacity of the composite sealant, especially at high differential gas pressure. The alkali-free glass composition minimized the ion migration under electrical potential, which should significantly improve the long-term stability and durability of the seal under typical SOFC operating conditions.

Publications cited herein and the materials for which they are cited are specifically incorporated by reference. Modifications and variations of the methods and devices described herein will be obvious to those skilled in the art from the foregoing detailed description. Such modifications and variations are intended to come within the scope of the appended claims.

What is claimed is:

1. A glass or glass-ceramic sealant composition comprising:

a glass constituted from a mixture of alkali-free inorganic oxides, the mixture including, on a mole basis, 20 to 50% BaO, 1 to 10% $Y_2O_3$, 5 to 20% $B_2O_3$, 10 to 30% $SiO_2$, 3 to 35% MgO, 2 to 20% CaO, 1 to 10% ZnO, and 0 to 5% $ZrO_2$, wherein the glass or glass-ceramic sealant composition upon heating to a temperature above its softening point devitrifies and crystallizes, and wherein the glass or glass-ceramic sealant composition is adapted to seal solid oxide fuel cell components.

2. A composite sealant composition comprising:
a glass component constituted from a mixture of alkali-free inorganic oxides, wherein the glass component comprises, on a mole basis, 20 to 50% BaO, 1 to 10% $Y_2O_3$, 5 to 20% $B_2O_3$, 10 to 30% $SiO_2$, 3 to 35% MgO, 2 to 20% CaO, 1 to 10% ZnO, and 0 to 5% $ZrO_2$; and
a filler component dispersed in the glass component, said filler component being up to 40% by weight of the composition, wherein the glass component upon heating to a temperature above its softening point will devitrify and crystallize to transform the glass component into a glass-ceramic matrix in which the filler component is dispersed.

3. The composition of claim 1, wherein the glass component comprises on a mole basis 25 to 35% BaO.

4. The composition of claim 1, wherein the glass component comprises on a mole basis 1 to 3% $Y_2O_3$.

5. The composition of claim 1, wherein the glass component comprises on a mole basis 14 to 18% $B_2O_3$.

6. The composition of claim 1, wherein the glass component comprises on a mole basis 15 to 25% $SiO_2$.

7. The composition of claim 1, wherein the glass component comprises on a mole basis 10 to 20% MgO.

8. The composition of claim 1, wherein the glass component comprises on a mole basis 10 to 18% CaO.

9. The composition of claim 1, wherein the glass component comprises on a mole basis 1 to 3% ZnO and 1 to 2% $ZrO_2$.

10. The composition of claim 2, wherein the filler component is non-metal.

11. The composition of claim 2, wherein the filler component comprises zirconia, alumina, barium titanate, strontium titanate, or a combination thereof.

12. The composition of claim 2, wherein the filler component comprises yttria-stabilized zirconium oxide.

13. The composition of claim 12, wherein the filler component further comprises barium titanate.

14. The composition of claim 2, wherein the glass component and the filler component are mixed with a binder system which comprises one or more thermoplastic polymers.

15. The composition of claim 14, which is in the form of a tape.

16. A composite sealant composition comprising:
a glass component including, on a mole basis, 25 to 35% BaO, 1 to 3% $Y_2O_3$, 14 to 18% $B_2O_3$, 15 to 25% $SiO_2$, 10 to 20% MgO, 10 to 18% CaO, 1 to 3% ZnO, and 1 to 2% $ZrO_2$; and
a filler component dispersed in the glass component, said filler component being up to 40% by weight of the composition.

17. The composition of claim 16, wherein the filler component is selected from the group consisting of zirconia, alumina, barium titanate, strontium titanate, and combinations thereof.

18. A solid oxide fuel cell stack comprising:
a first structural component;
a second structural component; and
a sealant composition disposed between and contacting the first component and the second component, wherein the sealant composition comprises a glass component which comprises a mixture of alkali-free inorganic oxides, wherein the glass component comprises, on a mole basis, 20 to 50% BaO, 1 to 10% $Y_2O_3$, 5 to 20% $B_2O_3$, 10 to 30% $SiO_2$, 3 to 35% MgO, 2 to 20% CaO, 1 to 10% ZnO, and 0 to 5% $ZrO_2$; and a filler component dispersed in the glass component, said filler component being up to 40% by weight of the composition, wherein the glass component upon heating to a temperature above its softening point will devitrify and crystallize to transform the glass component into a glass-ceramic matrix in which the filler component is dispersed.

19. The fuel cell stack of claim 18, wherein the first component is a first fuel cell and the second component is a separator plate.

20. The fuel cell stack of claim 18, wherein the first component is a stack of two or more fuel cells and the second component is a manifold for directing fuel and oxidant into and out of the stack.

21. A process for sealing a fuel cell stack, comprising the steps of:
forming a composite sealant mixture comprising a glass component, which comprises a mixture of alkali-free inorganic oxides, wherein the glass component comprises, on a mole basis, 20 to 50% BaO, 1 to 10% $Y_2O_3$, 5 to 20% $B_2O_3$, 10 to 30% $SiO_2$, 3 to 35% MgO, 2 to 20% CaO, 1 to 10% ZnO, and 0 to 5% $ZrO_2$; in which a filler component is dispersed, wherein the filler component is up to 40% by weight of the total weight of the glass component and the filler component, wherein the glass component upon heating to a temperature above its softening point will devitrify and crystallize to transform the glass component into a glass-ceramic matrix in which the filler component is dispersed;
applying the composite sealant mixture to a selected location of the fuel cell stack; and
transforming the composite sealant mixture to seal the selected sealant location.

22. The process of claim 21, wherein the composite sealant mixture is applied in the form of a paste or a tape.

23. The process of claim 21, wherein the composite sealant mixture further comprises an organic binder material.

24. The process of claim 21, wherein the transformation step comprises heating the sealant mixture to a temperature above the softening point of the glass component to devitrify and crystallize the glass component, transforming it into a glass-ceramic matrix in which the filler component is dispersed.

25. The process of claim 21, wherein the seal of the fuel cell stack is effective under pressure differentials up to 5 psig.

26. The composition of claim 2, wherein a seal formed by the composite sealant composition is effective under a pressure differential up to 5 psig.

* * * * *